May 16, 1933.  C. A. AGAR  1,909,513
METHOD AND APPARATUS FOR MAKING LAMINATED ANGULAR MEMBERS
Filed Oct. 31, 1930  4 Sheets-Sheet 1
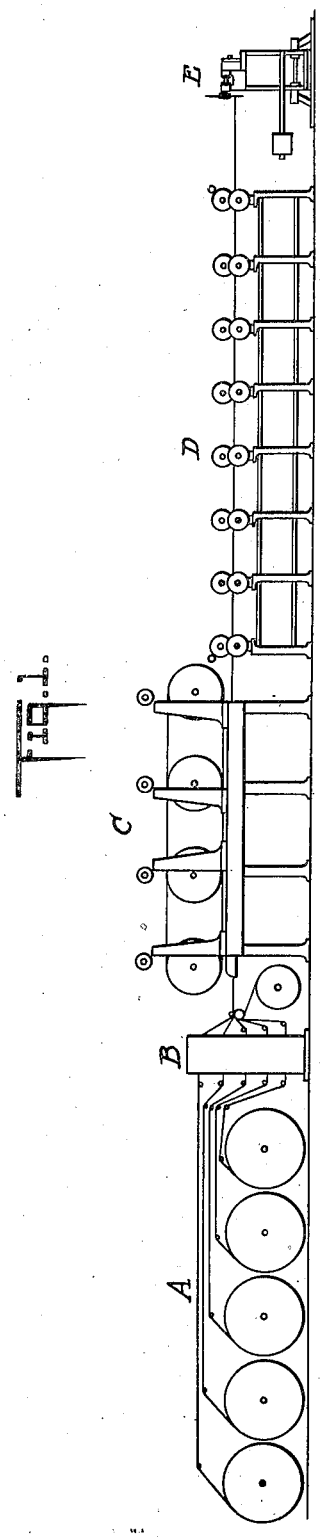
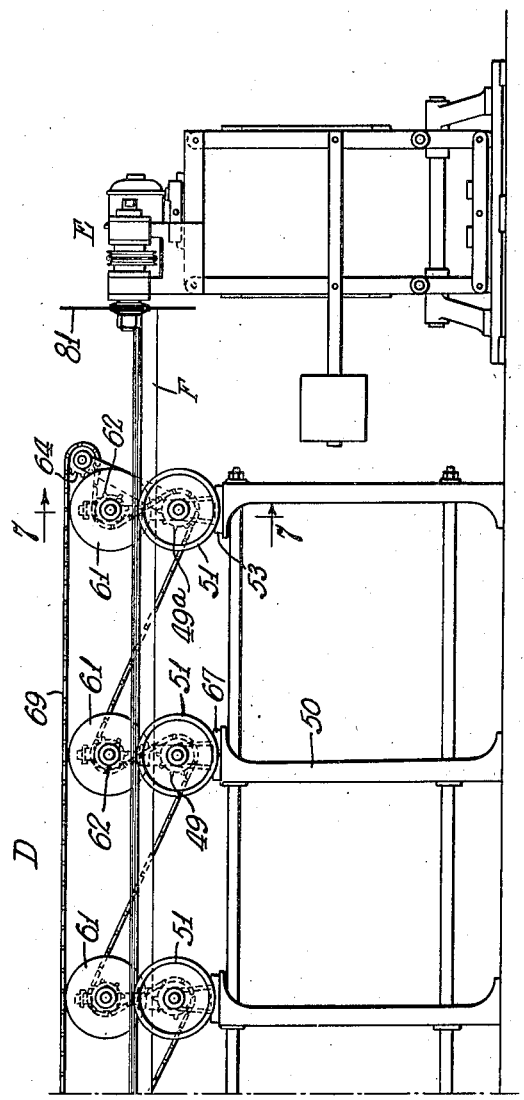
INVENTOR
Calvin A. Agar
BY
ATTORNEYS

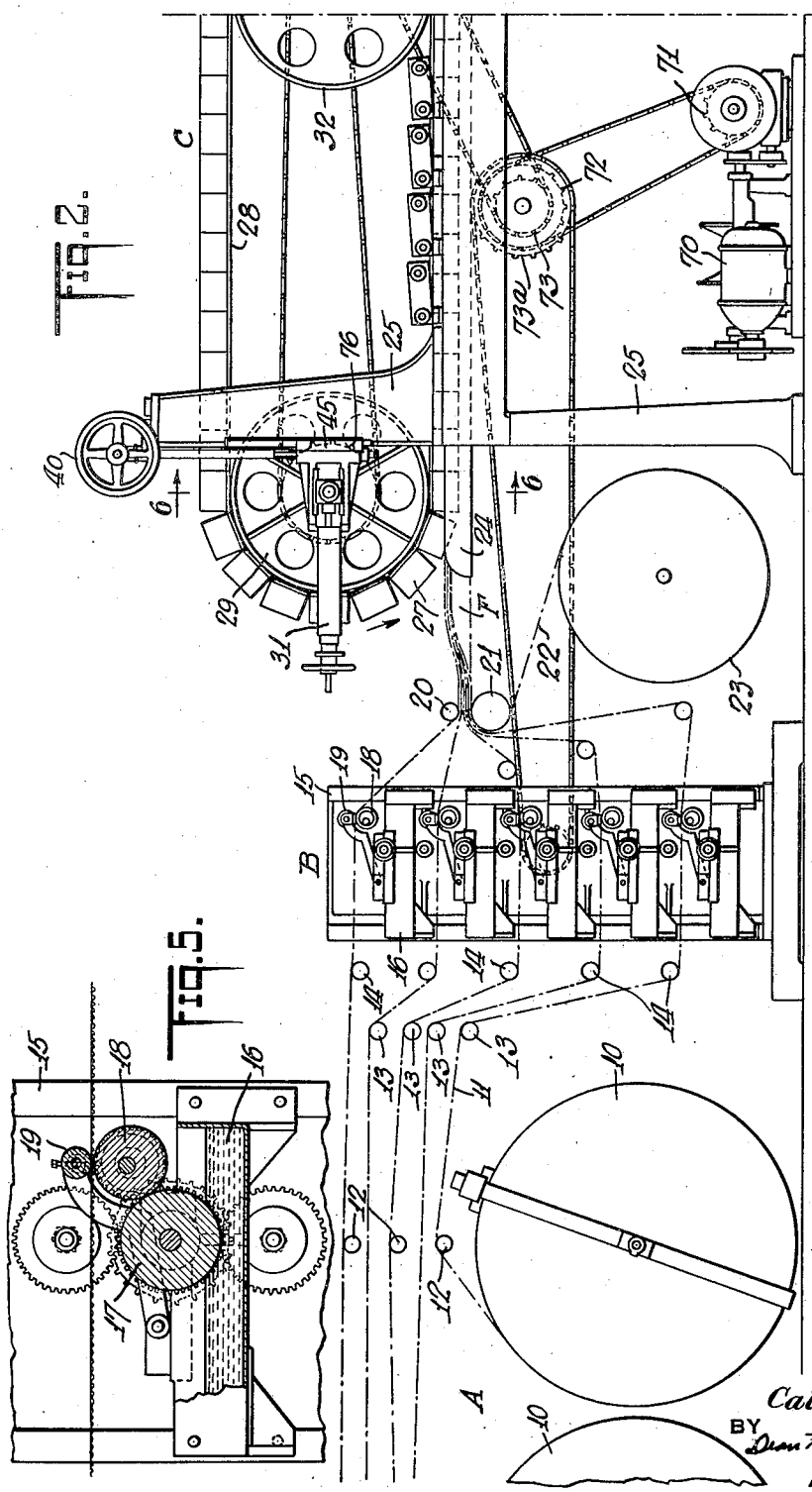

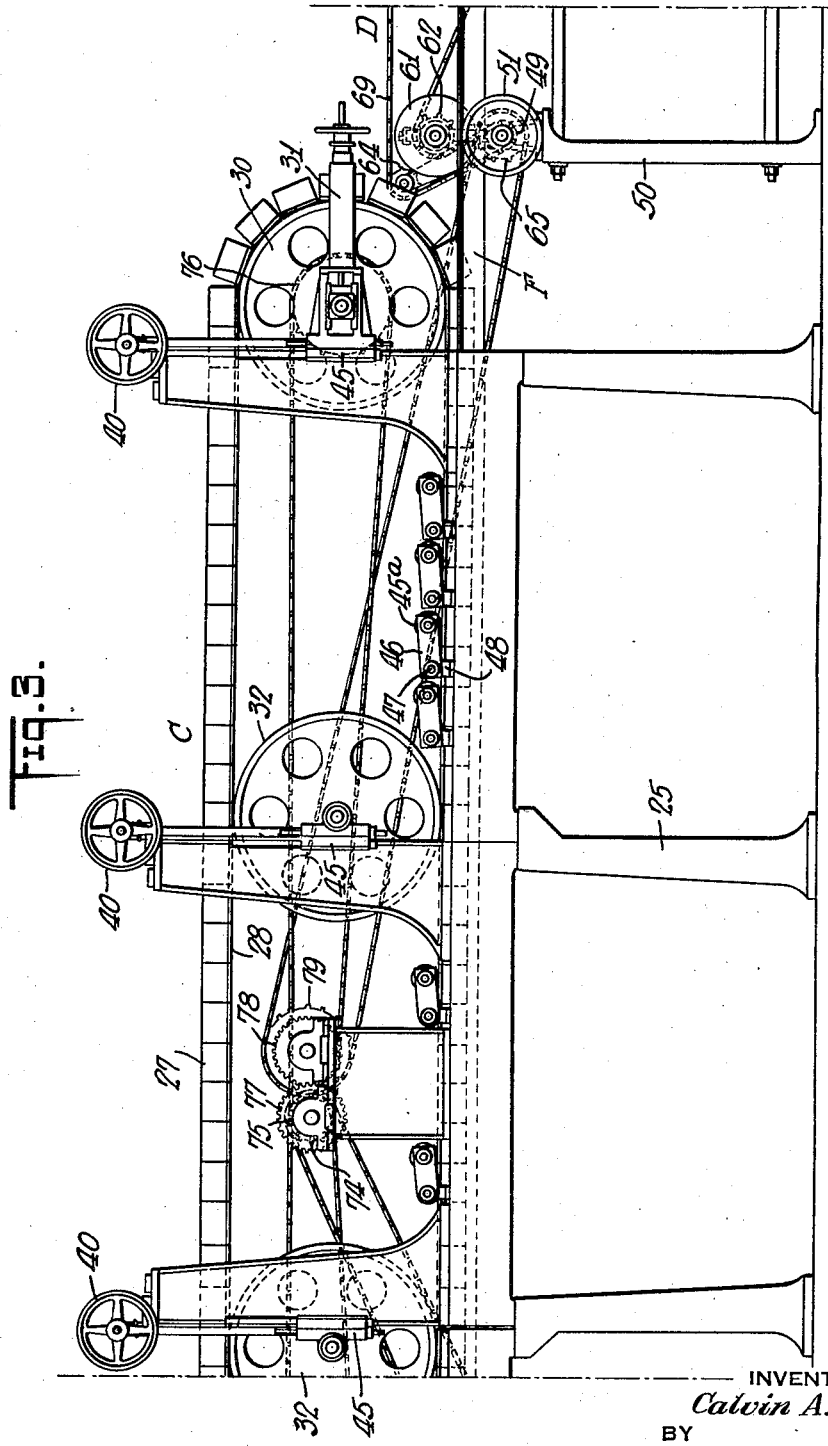

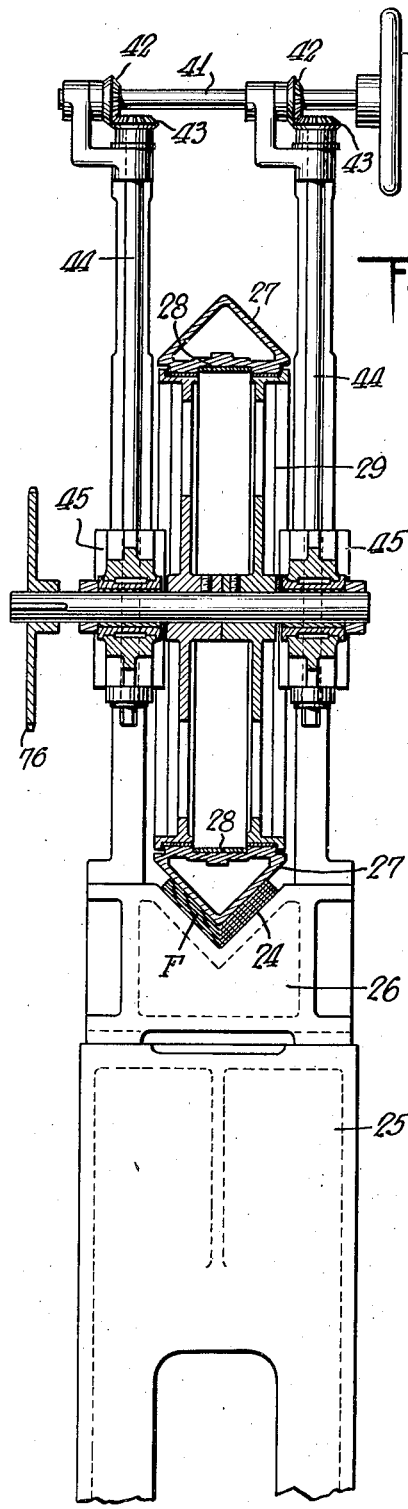
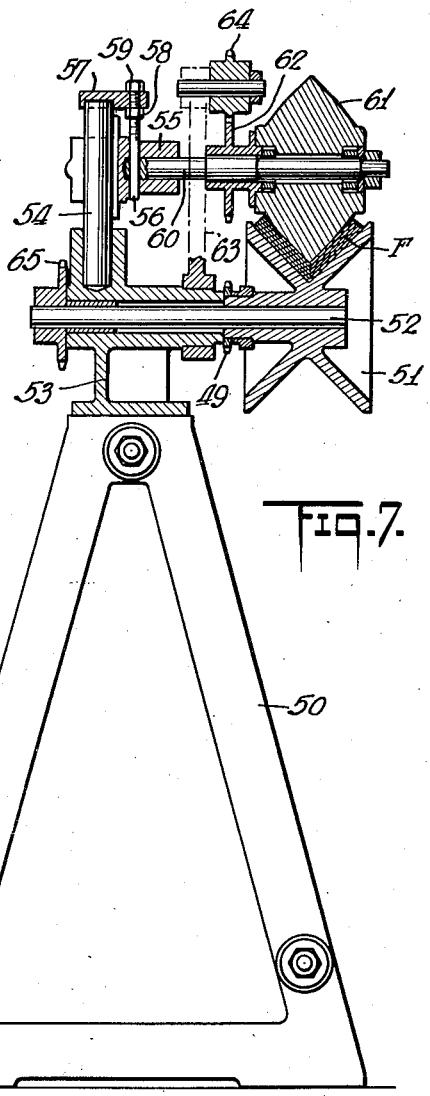

Patented May 16, 1933

1,909,513

UNITED STATES PATENT OFFICE

CALVIN A. AGAR, OF WEST ORANGE, NEW JERSEY

METHOD AND APPARATUS FOR MAKING LAMINATED ANGULAR MEMBERS

Application filed October 31, 1930. Serial No. 492,434.

The present invention relates to a process and apparatus for making stiff laminated or multi-ply angular members consisting of a plurality of nested and adhesively connected sheets. These members are used for such varied purposes as reinforcing members, article supporters, or braces as shown in Fig. 5 of my Patent 1,613,152, dated September 4, 1927, and may consist of a plurality of superimposed alternate layers of corrugated and facing sheets.

The present invention involves a new and improved process for forming such laminated angular members, and consists in simultaneously bending together into angular nested relationship a plurality of individually scored and adhesive coated webs. This process serves to insure the substantial alinement of the corners of the individually bent sheets constituting the ultimate angular member.

Among the important features of the present invention are the bending of superposed adhesive coated sheets into angular form while subjecting them to adhesive setting heat; a new and improved means for effecting the adhesive applying and bending operations; the simultaneous bending and pressing of the individually scored and adhesively coated webs; and an arrangement whereby all of the sheets are simultaneously coated with adhesive, while disposed in superimposed relationship and before they are bent and pressed into the desired form.

The invention still further provides means whereby the dies which serve to bend the superimposed sheets into angular shape, travel with said sheets in pressing relationship therewith, while said sheets are being subjected to adhesive drying heat. By means of this arrangement, the successive portions of the sheets are continuously subjected to pressure influence during bending and heating operations, thereby preventing the separation of the individual sheets during these operations.

The invention also includes certain other new and important features of construction and combinations of parts, and process steps and combinations of steps hereinafter set forth and claimed.

Although the novel features which are believed to be characteristic of this invention will be particularly pointed out in the appended claims, the invention itself, as to its objects and advantages, the mode of its operation and the manner of its organization may be better understood by referring to the following description taken in connection with the accompanying drawings forming a part thereof, in which Fig. 1 is a diagrammatic view showing the complete arrangement of the various units of a machine embodying the present invention.

Figs. 2, 3 and 4 are elevational views showing successive portions of the machine, the dot and dash line at the right of Fig. 2, at both ends of Fig. 3, and to the left of Fig. 4 indicating the lines of severance between the three figures.

Fig. 5 is an enlargement of one of the adhesive applying units shown partly in section.

Fig. 6 is a section taken on line 6—6 of Fig. 2, and

Fig. 7 is a section taken on line 7—7 of Fig. 4.

Like reference characters denote like parts in the several figures of the drawings.

In the following description and in the claims parts will be identified by specific names for convenience, but they are intended to be as generic in their application to similar parts as the art will permit.

In the operation of the invention, the various webs which are used in making up the laminated angular member are first unrolled from a supply or intake unit A (Fig. 1), passed through unit B where adhesive is applied thereto, and then advanced through unit C where the sheets are bent, pressed and adhesively set together into angular form. The bent sheets are then passed through a traction unit D which serves to draw the sheets through the entire system. The bent sheets are then cut into selective lengths by a cut-off unit E.

At the intake end of the machine, the unit

A consists of supports for a plurality of rolls 10, each of which comprises a continuous sheet of single faced corrugated paper 11 or other sheet material. These sheets may be scored along the lines of proposed bending after they leave the rolls 10, or they may be scored previously when they are cut to the desired width and wound to form said rolls. These scored sheets are guided over a plurality of sets of rolls 12, 13 and 14 and into the adhesive applying unit B.

The unit B consists of a support 15 which advantageously holds a plurality of individual adhesive applying units arranged in a tier. Each one of these units includes an adhesive containing pan 16 in which is immersed a pick-up roll 17 having a surface contact with a transfer roll 18. Spaced from the latter is a pressure roll 19 beneath which the sheet travels.

Each transfer roll 18 is so mounted that it can be adjusted to effect any selective spacing between this roll and the adhesive pick-up roll 17. For instance, it may have an eccentric support. The roll 19 is provided with suitable adjusting means, whereby its height with respect to the roll 18 can be regulated. These rolls 17 and 18 may be rotated by any suitable means.

Each of the single faced corrugated sheets 11 passes between the rolls 18 and 19, with its corrugated face turned downwardly and adhesive is applied to the crowns of the corrugations. These sheets are then collectively advanced between two rolls 20 and 21 whereby they are brought together into close superimposed relationship. A plain web 22 from a roll 23 is then passed between said rolls 20 and 21 so as to form a facing for one side of said sheets. The sheet 22 may be scored before being wound on the roll 23, or may be scored as it is unwound, or scoring may be omitted as the sheet is thin and easily bent.

The sheets, after they emerge from between the two rolls 20 and 21, pass into the unit C where they are bent and pressed into shape and the adhesive thereon set or dried. This unit includes a female die member in the form of a V shaped trough 24 supported on a suitable frame structure 25. This trough is heated, as for instance by being jacketed on its outer side by a chamber 26 for the reception of steam or other heating fluid. The sheets as they pass into the field of action of the trough 24 are bent into angular shape by a plurality of V shaped male die members 27 which are complementally shaped with respect to said troughs and which are appositively connected in endless series by a belt 25. The blocks have curved inner surfaces for engaging the peripheries of driving wheels 29 and 30. These wheels are each made of two axially spaced sections, and the belt which may be of band saw steel is riveted or bolted to the blocks and lies between the two sections of the driving wheels. Thus the traction is primarily on the blocks and the belt merely connects them in series. These driving wheels are supported on the frame structure 25 and are provided with adjusting means 31 for regulating the tension of the belt 28. Disposed between the driving wheels 29 and 30 are one or more wheels 32 which serve to support the top run of the belt 28 and press the bottom run into the trough 24. The vertical position of each of the driving wheels 29 and 30 and the wheels 32 may be adjusted to any selective height by any suitable means which, according to the specific form shown, includes a hand wheel 40 connected to one end of a shaft 41 carrying a pair of bevel gears 42. Each of these bevel gears meshes with a bevel gear 43 disposed at one end of the corresponding spindle 44, the other end of which has a threaded engagement with the bearing block 45 of the wheels 29 and 30 and the wheels 32. In this way, the vertical position of the die members 27 may be adjusted to accommodate for the desired stack thickness of angular strip F being formed and the pressure to be applied.

In order to urge the male die members 27 into close cooperating relationship with the trough 24 forming the female die member, there are advantageously provided a plurality of rollers 45a resting on the lower run of the belt 28. Each of these rollers is journaled at the end of an arm 46, pivoted at 47 to a bracket 48, which is connected to the frame structure 25 of the machine. The weight of these rollers 45a on the belt serves to press the die members 27 into the trough to more effectively hold the sheets in the desired form during operation.

The belt and male die members constitute a feeding means but to prevent slippage, additional means comprising the unit D is provided for unrolling the webs 11 from their respective roll 10 and drawing them through different parts of the apparatus already described. The unit D in the form shown includes a frame structure 50 supporting a series of pairs of cooperating rollers. (Fig. 7). The lower roller 51 has a V shaped peripheral groove, is mounted on one end of a shaft 52 journaled in a bracket 53, and has a sprocket wheel 49. The bracket 53 carries an arm 54 which has a spline connection with a vertically sliding member 55 having fixed thereto a rod 56, one threaded end of which projects through a bracket 57 mounted on the upper end of the arm 54. The threaded portion of this spindle 56 on opposite sides of the bracket arm 57 carries adjusting nuts 58 and 49, whereby upon tightening one unit and loosening the other, the member 55 may be raised or lowered on the arm 54. A shaft 60 is mounted in the member 55 and rotatably supports at one end thereof the upper roller 61. The rod 56 may pass into or through the shaft 60 to lock the latter in place and against rotation. The roller 61 has its periphery substantially complemental to the groove of the periphery of the roller 51 and cooperates therewith. Fixed to the roller 61 but loosely mounted with respect to the shaft 60 is a sprocket wheel 62.

These pairs of co-acting rollers are spaced along the unit D at suitable distances and all may be constructed alike except that the shaft 52 at one end of the series has a sprocket 65 and the two end brackets 53 each has connected thereto a bracket arm 63, one end of which carries a sprocket wheel 64. A chain 69 passes around all of the sprocket wheels 64, 62 and 49 in succession as shown in Fig. 7 so that all of the traction rollers cooperate to advance the sheet towards the cutting unit E.

Any suitable means may be employed for actuating all of the rotatable elements of the units C and D in synchronism. For instance, there may be provided a motor 70 or any other suitable motive power, which drives a sprocket wheel 71 having a chain engagement with a sprocket wheel 72. The shaft of the sprocket wheel 72 carries a sprocket wheel 73a for a driving chain, which serves to operate the adhesive applying units and also carries a sprocket wheel 73 having a chain engagement with a sprocket wheel 74. The shaft of this sprocket wheel 74 carries a pair of sprocket wheels 75, one of which has a chain engagement with a sprocket wheel 76 connected to the shaft of the driving wheel 29 and the other to the driving wheel 30. The shaft of the sprocket wheel 74 also carries a gear 77 which meshes with a gear 78 on the shaft of which there is a sprocket wheel 79 having a chain engagement with the sprocket wheel 65 on one of the shafts 52.

The drive is such that each pair of feed rollers runs slightly faster than the preceding pair and they all run slightly faster than the die blocks 27. Thus the material is kept under tension and buckling is prevented. The peripheral surface of one of the two rollers 51 and 61 may be slightly cut away so as to relieve the strip of the rubbing action which would otherwise be caused by the fact that the side edges of the rollers run at different peripheral speeds than the parts engaging the angle of the strip.

As the bent member F emerges from the field of action of the unit D, it passes into the field of action of the unit E which carries a cutter 81 for subdividing this member into selective lengths. This cutting unit D may be so constructed that the cutter 81 travels with the material during cutting operation and then moves out and returns for the next cut so that the continuous operation of the machine is not disturbed. This cutter mechanism may be of the type commonly employed for cutting continuously fed spirally wound tubes or of any other suitable type.

It should also be noted that the members 27 may be shaped to constitute female die members and the shape of the trough 24 correspondingly shaped to form the male end of the die unit without departing from the spirit of the invention. Likewise, the die member might be so formed as to bend the sheets along two parallel lines and produce a channel or U-shaped product.

Having thus described my invention, what I claim as new and desire to secure by Letters Patent is:

1. An apparatus for forming stiff multiply angular articles from adhesively associated superposed paper sheets including a stationary die element, a plurality of movable die elements complementally shaped with respect to said stationary die element and disposed in endless series above said stationary die element, and means for advancing said movable die elements successively into cooperative relationship with said stationary die element.

2. An apparatus for forming stiff multiply angular articles from adhesively associated paper sheets including a stationary V shaped trough forming one element of a die, a fluid jacket adjoining said trough along its length and disposed in heat transferring relationship therewith, an endless conveyor belt, a plurality of travelling die elements complementally shaped with respect to said trough and mounted on said conveyor belt, means for advancing said sheets along said trough, and means for advancing said travelling die elements successively into cooperative relationship with said trough and into pressing relationship with said advancing sheets and along said trough in pressing relationship with said advancing sheet.

3. An apparatus for forming stiff multiply angular articles from adhesively associated paper sheets including a relatively narrow and long die element having a V shaped die surface, means for heating said die surface, an endless conveyor belt, a plurality of movable die elements complementally shaped with respect to said trough and mounted on said conveyor belt in appositive relationship, means for advancing said sheets through the field of action of said trough, and means for advancing said movable die elements successively into cooperative relationship with said stationary die element and into pressing relationship with said advancing sheets and along said stationary die element in pressing relationship with said advancing sheet.

4. An apparatus for forming stiff laminated angular members from scored paper sheets including means for applying adhesive to a plurality of separate sheets, a heating device, means for superposing said sheets, and means for bending all of the superposed sheets simultaneously into angular form and advancing them at the same time along said heating device to set the adhesive between said sheets while holding them under pressure in bent form.

5. The process of forming stiff, multi-ply, angular, corner protecting members, which includes the steps of bending together into nested angular form a plurality of superposed corrugated sheets having adhesive therebetween, and subjecting said sheets to adhesive setting heat while confining said sheets in bent form.

6. The process of forming stiff, multi-ply angular, corner protecting members, which includes the steps of bending together into nested angular form a plurality of superposed single faced scored corrugated sheets having adhesive therebetween, while simultaneously subjecting said sheets to adhesive setting heat.

7. The process of forming stiff, multi-ply, angular, corner protecting members, which includes the steps of bending together into nested angular form a plurality of superposed scored single faced corrugated sheets having adhesive therebetween, and subjecting said sheets to heat while said sheets are in bent angular form to permanently set said sheets in said angular form.

8. An apparatus for forming multi-ply angular articles from adhesively connected single faced corrugated sheets, including a stationary V shaped trough forming one element of a die, an endless conveyor belt disposed above said trough, and a plurality of traveling die elements complementally shaped with respect to said trough, and mounted on said conveyor belt, said die elements being adapted to successively move into cooperative relationship with said trough to angularly bend said sheets.

9. An apparatus for forming multi-ply angular articles from adhesively connected single faced corrugated sheets, including a stationary die element comprising two plane die surfaces angularly positioned with respect to each other, an endless conveyor belt disposed above said stationary die element, and a plurality of traveling die elements complementally shaped with respect to said stationary die element, and mounted on said conveyor belt, said traveling die elements being adapted to successively move into cooperative relationship with said stationary die element to angularly bend said sheets.

10. An apparatus for forming multi-ply angular articles from adhesively connected single faced corrugated sheets, including a stationary die element, a conveyor belt disposed above said stationary die element, a plurality of traveling die elements complementally shaped with respect to said stationary die element, and mounted on said conveyor belt, said traveling die elements being adapted to successively move downwardly into cooperative relationship with said stationary die element, to angularly bend said sheets, and members resting on the lower run of said conveyor belt for urging said traveling die elements on said lower run downwardly into close relationship with said stationary die element.

11. An apparatus for forming stiff multiply angular articles, including a plurality of individual adhesive applying units arranged in a tier, each of said units including an adhesive container, means for simultaneously drawing a plurality of horizontally scored webs through each of said units to apply adhesive to one side of each of said webs, means for bringing said webs together into superposed relationship, a stationary die element, a movable die element complementally shaped with respect to said stationary die element, means for advancing said movable die element into cooperative relationship with said stationary die element, and means for advancing said sheets through the field of operation of said die elements to bend said webs together into angular form.

12. An apparatus for continuously forming stiff laminated angular corner protecting members from scored single faced corrugated sheets, including a plurality of adhesive applying members, traction means for continuously advancing said scored sheets through the field of operation of said adhesive applying members, whereby adhesive is applied to said sheets, means for disposing said coated sheets in superposed relationship with their score lines substantially in registry, means separate from said traction means, for angularly bending said sheets together along their score lines while said sheets are advancing, and means for heating said sheets while in bent form to set the adhesive between said sheets.

Signed at Whippany in the county of Morris and State of New Jersey this 29th day of October A. D. 1930.

CALVIN A. AGAR.